United States Patent
Loafman

(10) Patent No.: US 7,139,879 B2
(45) Date of Patent: Nov. 21, 2006

(54) SYSTEM AND METHOD OF IMPROVING FAULT-BASED MULTI-PAGE PRE-FETCHES

(75) Inventor: Zachary Merlynn Loafman, Austin, TX (US)

(73) Assignee: International Business Machinces Corporation, Armonk, NY (US)

( * ) Notice: Subject to any disclaimer, the term of this patent is extended or adjusted under 35 U.S.C. 154(b) by 434 days.

(21) Appl. No.: 10/626,182

(22) Filed: Jul. 24, 2003

(65) Prior Publication Data

US 2005/0021916 A1    Jan. 27, 2005

(51) Int. Cl.
G06F 12/00    (2006.01)

(52) U.S. Cl. ................................. 711/137; 711/154

(58) Field of Classification Search .................. None
See application file for complete search history.

(56) References Cited

U.S. PATENT DOCUMENTS

| | | | | |
|---|---|---|---|---|
| 4,490,782 | A * | 12/1984 | Dixon et al. ................. | 711/136 |
| 5,210,849 | A * | 5/1993 | Takahashi et al. ........... | 711/144 |
| 5,623,608 | A * | 4/1997 | Ng ............................... | 711/137 |
| 5,778,436 | A * | 7/1998 | Kedem et al. ................ | 711/137 |
| 6,381,678 | B1 * | 4/2002 | Fu et al. ....................... | 711/137 |
| 6,487,640 | B1 * | 11/2002 | Lipasti ......................... | 711/140 |
| 6,728,840 | B1 * | 4/2004 | Shatil et al. ................. | 711/137 |

FOREIGN PATENT DOCUMENTS

JP    61136145 A  *  6/1986

OTHER PUBLICATIONS

File Access History Retention and Usage. IBM Technical Disclosure Bulletin. vol. 33, Issue 9, pp. 327-328. Feb. 1, 1991.*
Variable Length User Specified Page Fault (IBM Technical Bulletin, Sep. 1991, p. 62).*

* cited by examiner

Primary Examiner—Reginald Bragdon
Assistant Examiner—Kaushik Patel
(74) Attorney, Agent, or Firm—Volel Emile; Leslie Van Leeuwen; Mark S. Walker

(57) ABSTRACT

A system and method of improving fault-based multi-page pre-fetches are provided. When a request to read data randomly from a file is received, a determination is made as to whether previous data has been read from memory (i.e., RAM) or from a storage device. If the data has been read from memory, an attempt is made to read the present requested data from memory. If the data is in memory it is provided to the requester. If the data is not in memory, a page fault occurs. If the requested data has a range that spans more than one page, the entire range is read in by a page fault handler. If previous data has not been read from memory, it will be assumed that the present requested data is not in memory. Hence, the present requested data will be loaded into memory. Loading random data that spans a range of more than one page all at once into memory inhibits the system from pre-fetching on the range due to fault-based sequential data accesses.

12 Claims, 3 Drawing Sheets

SYSTEM AND METHOD OF IMPROVING FAULT-BASED MULTI-PAGE PRE-FETCHES

BACKGROUND OF THE INVENTION

1. Technical Field

The present invention is directed to accesses to memory by input/output devices. More specifically, the present invention is directed to a system and method of improving fault-based multi-page pre-fetches.

2. Description of Related Art

Operating systems (OSs) as well as application programs are increasingly getting larger in size. Correspondingly, the amount of physical memory (i.e., random access memory or RAM) space they need to properly execute is also increasingly growing larger. However, to provide enough RAM space for simultaneous executions of an OS and an indeterminate number of application programs is unfeasible. Consequently, virtual memory is used.

Virtual memory is imaginary memory and is supported by most operating systems. (OSs and application programs will henceforth be referred to as programs.) Each executing program, which includes code and data, is allocated a certain amount of virtual memory space. For example in Windows-based systems, each executing program is allocated 2 GB of virtual memory space. Thus, virtual memory is ostensibly limitless.

Each executing program is also allocated a certain amount of RAM space since a program must physically be in RAM in order to execute. However, allocated virtual memory space is usually much larger than allocated RAM space. Hence, a program that fits into its allocated virtual memory space may not all fit (especially its data) into its allocated RAM space. Since virtual memory does not really exist, the portion of the program that does not fit into the RAM is placed in a storage device (e.g., disk, tape, cartridge etc.). This allows the system to nonetheless execute the program by copying into RAM sections of the program needed at any given point during its execution.

To facilitate copying sections of a program into RAM, the operating system divides the virtual memory into virtual pages and the RAM into physical pages (also known as page frames). Each virtual page contains a fixed amount of space. Each physical page contains an equally fixed amount of space. Addresses of virtual pages are called virtual addresses and those of the physical pages are called physical addresses.

Thus, a page of data may either be in RAM or in a storage device. To keep track of which pages are in RAM, a virtual memory manager (VMM) is used. The VMM is a process that is primarily responsible for managing the use of both the RAM and the virtual memory. To do so, the VMM keeps track of each page that is in RAM and swaps pages to and from the storage device both on demand and routinely.

An on-demand swap occurs when an executing instruction of a program requests data that is not already in RAM. Particularly, when requesting data an executing program will provide the virtual address of the data. The virtual address is then translated into its physical address equivalent. If after the address translation the page on which the data is located is identified as being absent from the RAM, a page-fault exception is raised. A page fault results in switching immediately to a page fault handler. Using a replacement algorithm (e.g., a least recently used algorithm or LRU) a page of data in RAM is transferred onto the storage device. The page fault handler then loads the page onto which the requested data is located into the now-vacant page in RAM and, upon return, the instruction that generated the page fault is re-executed. This is a relatively fast process, but accumulating many page faults can have a drastic impact on performance.

Consequently, to reduce the number of page faults that may occur during the execution of a program, a method known as read-ahead or data pre-fetching is used. As the name suggests, data pre-fetching involves obtaining data before it is needed. Various types of data pre-fetching techniques have been developed. One of these techniques is called spatial data pre-fetching.

Spatial data pre-fetching is based on the likelihood that once data is referenced, nearby data is also likely to be referenced. That is, the decision to pre-fetch data is determined by the current data block access (e.g., fetching the data block adjacent to the data block currently being accessed).

Spatial data pre-fetching works splendidly when data is being read sequentially. For example, after two consecutive page faults of sequentially stored data, a block of sequential pages of data will be pre-fetched through normal data read-ahead. Hence, if future referenced pages are part of the pre-fetched block, which is highly likely when data is being read sequentially, the data will have already been in RAM when needed.

However, if data is being read randomly, spatial data pre-fetching may not work as well. For example, suppose an executing program is randomly reading data. Suppose further that the executing program makes a request to read a certain amount of data that resides on two sequential pages. If the data is not already in RAM, two page faults will be raised in order to load the two pages in the RAM. Because the pages are sequential, the system may infer that data is being read sequentially; and hence, pre-fetch a block of sequential pages of data. Since data is being read randomly, it is highly unlikely that future needed data will be on the pre-fetched block of pages. Thus, the block of pages may have been pre-fetched in vain and the physical pages onto which they are placed wasted. As will be explained later, continually pre-fetching unneeded pages of data may place an undue pressure on RAM space.

Thus a need exists for a system and method of improving multi-page fault-based data pre-fetches.

SUMMARY OF THE INVENTION

The present invention provides a system and method of improving fault-based multi-page pre-fetches. When a request to read data randomly from a file is received, a determination is made as to whether previous data has been read from RAM or from a storage device. If the data has been read from RAM, an attempt is made to read the present requested data from RAM. If the data is in RAM it is provided to the requester. If the data is not in RAM, a page fault occurs. If the requested data has a range that spans more than one page, the entire range is loaded in RAM by a page fault handler. If previous data has not been read from the RAM, it will be assumed that the present requested data is not in the RAM. Hence, the present requested data will be loaded into the RAM. Loading random data that spans a range of more than one page all at once into the RAM inhibits the system from pre-fetching data due to fault-based sequential data accesses.

In a particular embodiment, a trust value is assigned to a file when the file is opened. Each time data is to be read randomly from the file, the trust value is examined to determine whether previous data from the file was read from the RAM or from the storage device. If it is determined that previous data was read from the RAM it is assumed that the present requested data is also in the RAM. If the present requested data is indeed in the RAM, the trust value is incremented by a trust award. If the present requested data is not in the RAM, the trust value is decremented by a trust penalty. If, however, it is determined that previous data was not read from the RAM, it will be assumed that the present requested data is not in the RAM. The trust value is used to assist the system in determining whether the data is in the RAM or not. In any case, the data will be loaded into the RAM and the trust value will be incremented by the trust award.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
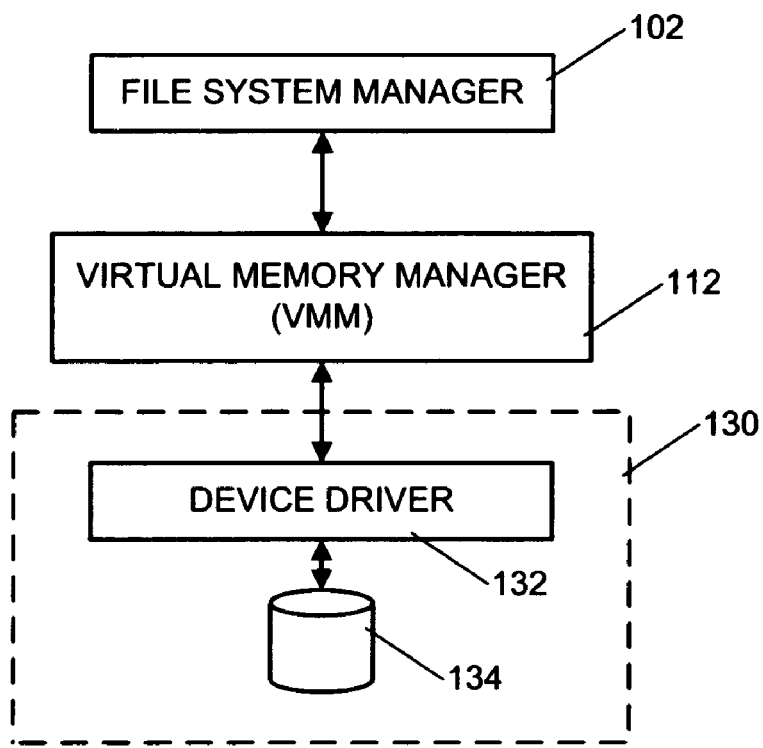
FIG. 1 depicts a conceptual view of a storage subsystem of a computer system.

With reference now to the figures, FIG. 1 depicts a conceptual view of a storage subsystem of a computer system. The storage subsystem includes a file system manager 102, a VMM 112 and a block device layer 130. The block device layer includes a device driver 132 and a storage device 134. As mentioned before, the storage device 134 may be a disk, cartridge, tape or any other type of non-volatile memory. It should be noted that the devices shown in FIG. 1 are not all inclusive. There may be more devices used by the storage subsystem. Consequently, FIG. 1 should be taken only as an example of a storage subsystem.

The file system manager 102 interacts with executing programs. For example, when an executing program desires to read data, it provides the virtual address and the range of the data to the file system manager 102. The file system manager 102 will check with the VMM 112 to see whether the data is already in RAM (not shown). In so doing, the physical manager will provide the virtual address and the range of the data to the VMM 112.

The VMM 112 then translates the virtual address into a physical address. If after the translation it is determined that the data is in RAM, it is returned to the file system manager 102 which will pass it to the requesting program. If it is not in RAM, a page fault will be raised. Then, the VMM 112 will notify the file system manager 102 that the data is not in RAM. A page fault handler (not shown) will load the data from the storage device 134 into RAM. Once the data is loaded, the VMM 112 will notify the file system manager 102 that the data is now in RAM.

To retrieve the data from the storage device 134, the device driver 132 is contacted. A device driver, as is well known in the art, acts as a translator between a device and programs that use the device. That is, the device driver accepts generic commands from programs and translates them into specialized commands for the device.

Figure 2:
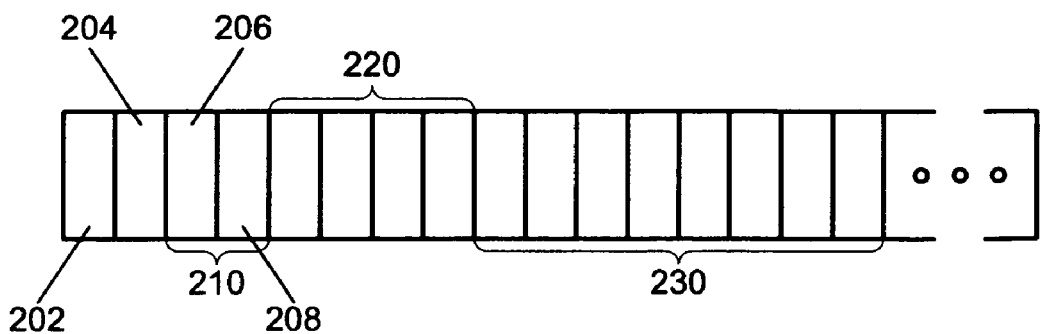
FIG. 2 is a conceptual view of sequential pages of data of a file.

As alluded to in the Description of the Related Art Section above, the VMM 112 anticipates future needs for pages of data of a file by observing the pattern used by a program that is accessing the file. FIG. 2 is a conceptual view of sequential pages of data in a file. When the program accesses two successive pages (i.e., pages 202 and 204) each using a page fault, the VMM 112 assumes that the program will continue to access the data sequentially. The VMM 112 will then pre-fetch the next two successive pages (i.e., pages 206 and 208 of sequential block pages 210). If the program continues to access the data sequentially by accessing pre-fetched page 206, the VMM 112 will then pre-fetch the next four consecutive pages (i.e., the four pages in the sequential block of pages 220). Again, if the program then accesses pre-fetched page 208, the VMM 112 will pre-fetch the next eight consecutive pages (i.e., the eight pages in sequential block pages 230). This pattern will continue until the program accesses a non-sequential page or a block containing a maximum number of allowable pre-fetched pages is reached.

Thus, if a program is reading data randomly and in one instance requests a range of data that spans two, three, four etc. sequential pages that are not already in RAM, quite a number of pages may be pre-fetched in vain. If the program continually requests multiple pages of data randomly, the RAM may become over-committed. When the RAM is over-committed, thrashing may occur. Thrashing happens when the VMM continually pages data in and out of the RAM. When a system is thrashing, the system may not spend much time executing useful instructions; and thus, none of the active processes may make any significant progress. The present invention provides a heuristic algorithm that may be used to inhibit pre-fetching of data that is being accessed randomly.

The heuristic algorithm associates trust values with files. A trust value is a value that is used to enable a system to make an assumption as to whether or not requested data is in RAM. To do so, the invention starts by assigning a trust value of zero (0) to all files that are opened. Each time data is read from a file, its trust value is either incremented, if the assumption is correct, or decremented otherwise.

Specifically, when data is requested from a file, a determination (as is presently done) is made as to whether the file is being accessed sequentially or randomly. This determination is well known in the art and will not be explained. If the data in the file is being accessed sequentially, the invention will be bypassed. But, if the file is being accessed randomly, the file system manager will store the range of the read request in an in-memory inode.

To explain, each Unix directory entry contains a name and a pointer to an inode. The inode is associated with a file and includes the file size, permissions, a pointer to a sequence of disk blocks and one or two reference counts. A reference count is a number of file names that the file has. When a file is opened, its on-disk inode is read and converted into an in-memory inode. The in-memory inode is functionally identical to the on-disk inode except that it maintains a count of the number of processes that have opened the file in addition to the reference count maintained by the on-disk inode.

As mentioned above, the file system manager 102 will store the range of the data to be read in the in-memory inode of the file. For instance, if data with a range 8192, which spans two pages, is to be read, 8192 may be stored in the in-memory inode of the file. Then, the trust value associated with the file will be examined. If the trust value is greater than zero (trust value >0), it is an indication that previous data was read from RAM instead of from storage device 134. Therefore, it will be assumed that the present requested data is also in RAM. The trust value will then be increased by a value called a trust award and an attempt will be made to read the data from RAM.

If the data is in RAM, the data will be provided to the requesting program. If, however, the data is not in RAM, a page fault will occur. The VMM 112 will then notify the file system manager 102 and since the VMM does not keep the range of the data, it will also request that the file system manager 102 provide the range of the data again. The file system manager 102 will retrieve the range of the data from the in-memory inode of the file and provide it to the VMM 112. Using the range, the VMM 112 will load the data in RAM and the trust value will be decreased by a value called a trust penalty since the assumption was incorrect. Note that in this case the entire range of data will be read with just one page fault since the range is known. Hence, consecutive page faults will not be instituted in order to retrieve data stored on two or more consecutive pages and read-ahead will be obviated.

As explained above, the trust award is added to the trust value before the read is attempted. Thus, the trust penalty should be greater than the trust award otherwise the penalty will either be zero (0) or less. Further, a higher trust penalty allows for quick adaptability in the case where all future reads will generate a page fault. In this particular example, the trust award is one (1) and the trust penalty is twenty (20).

If the trust value is less or equal to zero (0), it is an indication that previously requested data was retrieved from the storage device 134 instead of from RAM. Therefore, it will be assumed that the present requested data will not be in RAM. Consequently, the file system manager 102 will pass the virtual address and the range of the data to be read to the VMM 112. The File system manager 102 will also instruct the VMM 112 to load the data in RAM. The VMM 112 will determine whether any of the pages of data to be read are already in RAM. All the pages that are not already in RAM will be retrieved from the storage device 134. Note that in this case pages will not be pre-fetched due to sequential data accesses because the data is not loaded in RAM as a result of a page fault; but rather, the data is pre-loaded into the RAM (i.e., before a fault occurs).

Here also, the trust value will be incremented by the trust award. In this case, the trust value is incremented to ensure that even if a file is not trusted, it will eventually be trusted after p reads, where p is less or equal to the trust penalty.

The invention should include a maximum trust value (i.e., the most a file will ever be trusted). This will allow the invention to adapt quickly to changing in-memory dynamics as for instance when a file that used to be in RAM and has been paged out onto the disk is being read. In that case, if the trust penalty is p and the trust maximum is m, the file will no longer be trusted after at most m/p faults, where m and p are integers. For example, a file which has a maximum trust value of 100 will no longer be trusted after 5 consecutive page faults if the trust penalty is 20. The minimum trust value however is p, the trust penalty, since when the trust value is less or equal to zero (trust value <=0), it will be incremented as each requested data will be assumed to be in the storage device 134.

The invention then provides an optimal way for a file system to adapt to a variety of random read workloads. These workloads include the case where data requested is entirely in the storage device 134 as well as the case where the data is wholly or partially cached. Indeed, the only suboptimal case occurs when a file is trusted (trust value >0) and the requested data fails to be in the RAM. In that case, a performance cost is paid for the attempt at reading the data from the RAM and for the resulting page fault. Nonetheless, the suboptimal case has performance advantages over present methods of reading data spanning more than one page into the RAM since only one page fault is used as opposed to the plurality of page faults that are ordinarily ensued.

Figure 3:
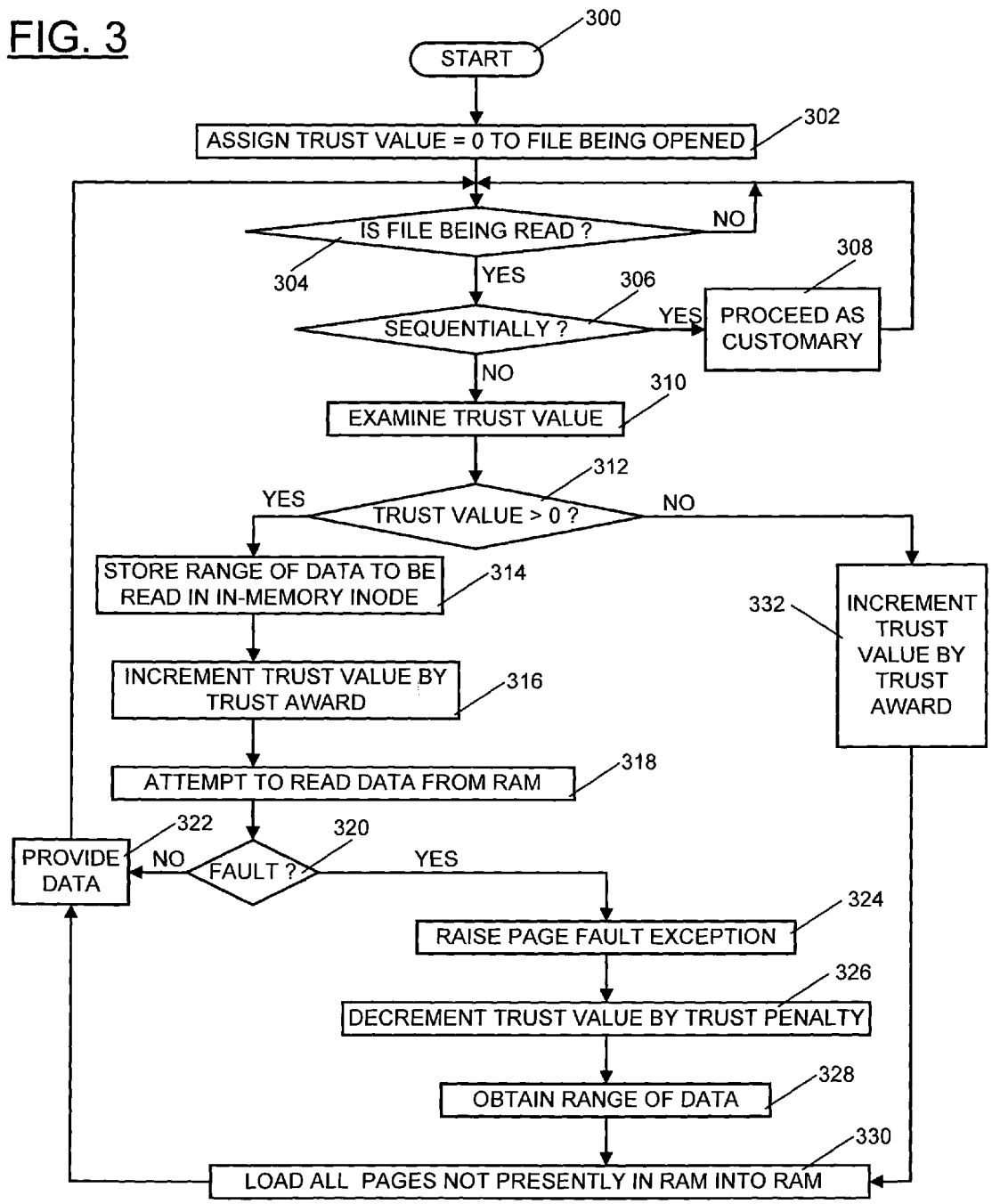
FIG. 3 is a flowchart of a process that may be used by the invention.

FIG. 3 is a flowchart of a process that may be used to implement the invention. The process starts when a file is opened by assigning a trust value to the file (steps 300 and 302). Then a check is made to determine whether the file is being read. If the file is being read, another check is made to determine whether the file is being read sequentially or randomly. If the file is being read sequentially, the process will continue as customary before it is returned to step 304 (steps 304, 306 and 308).

If the file is being read randomly, the trust value of the file is examined to determine whether it is greater than zero. If the trust value is greater than zero, the range of data to be read is stored in the in-memory inode of the file and the trust value is incremented by a trust award (steps 306, 310, 312, 314 and 316). An attempt is then made to read the data from RAM (step 318). If the attempt is successful, the data is conveyed to the requesting program (steps 320 and 322). If the attempt is unsuccessful, the trust value will be decremented by a trust penalty and a page fault exception will be raised. The VMM will then obtain the range of data stored in the in-memory inode from the file system manager and will load in RAM all pages that are not already there. The data will then be provided to the requesting program before the process returns to step 304 (steps 320, 324, 326, 328, 330 and 332).

If the trust value is less or equal to zero (0), the trust value is incremented by the trust award and the process jumps to step 330 (steps 312 and 332). Note that once the process starts, it will stay running until the computer system on which it is implemented is turned off or all open files (e.g., their in-memory inodes) are uncached.

Figure 4:
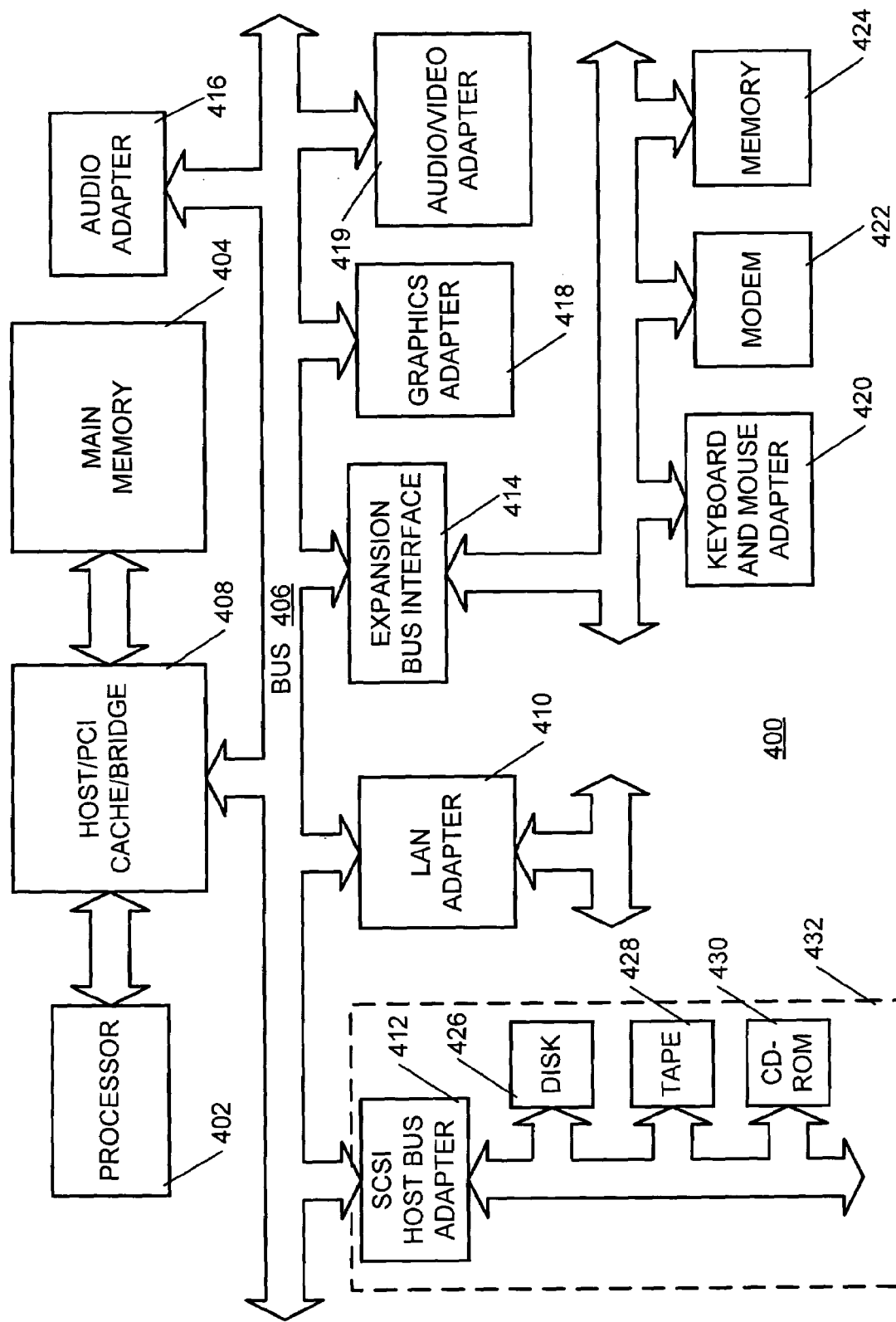
FIG. 4 is an exemplary block diagram illustrating a distributed data processing system according to the present invention.

FIG. 4 is a block diagram illustrating a data processing system in which the present invention may be implemented. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation or AIX, which is an IBM product. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs as well as the invention are located on storage devices, such as hard disk drive 326, and may be loaded into main memory 404 for execution by processor 402.

Those of ordinary skill in the art will appreciate that the hardware in FIG. 4 may vary depending on the implementation. Other internal hardware or peripheral devices, such as flash ROM (or equivalent nonvolatile memory) or optical disk drives and the like, may be used in addition to or in place of the hardware depicted in FIG. 4. Also, the processes of the present invention may be applied to a multiprocessor data processing system.

The description of the present invention has been presented for purposes of illustration and description, and is not intended to be exhaustive or limited to the invention in the form disclosed. Many modifications and variations will be apparent to those of ordinary skill in the art. Hence, the embodiment was chosen and described in order to best explain the principles of the invention, the practical application and to enable others of ordinary skill in the art to understand the invention for various embodiments with various modifications as are suited to the particular use contemplated.

What is claimed is:

1. A method of improving fault-based multi-page pre-fetches comprising the steps of:
    assigning a value to a file when the file is opened, the value for determining whether previous data has been read from a random access memory (RAM) or from a storage device;
    determining whether data from the file is being read randomly or sequentially upon receiving a request to read data from the file, the request including a range of data to be read, the range of data spanning more than one page;
    determining, if data is being read randomly from the file, whether previous data has been read from the RAM or from the storage device;
    attempting to read the data from the RAM if previous data has been read from the RAM or read the data all at once from the storage device using only one page fault if previous data has been read from the storage device; and
    increasing the value by an award if the requested data is in the RAM.

2. The method of claim 1 wherein if it is determined that previous data was read from the RAM, the value is decreased by a penalty if the requested data is not in the RAM.

3. The method of claim 2 wherein if it is determined that previous data was read from the storage device, the value is increased by the award.

4. The method of claim 3 wherein the penalty is larger than the award.

5. A computer program product on a computer readable medium for improving fault-based multi-page pre-fetches comprising:
    code means for assigning a value to a tile when the file is opened, the value for determining whether previous data has been read from a random access memory (RAM) or from a storage device;
    code means for determining whether data from the file is being read randomly or sequentially upon receiving a request to read data from the file, the request including a range of data to be read, the range of data spanning more than one page;
    code means for determining, if data is being read randomly from the file, whether previous data has been read from the RAM or from the storage device; p1 code means for attempting to read the data from the RAM if previous data has been read from the RAM or read the data all at once from the storage device using only one page fault if previous data has been read from the storage device; and
    code means for increasing the value by an award if the requested data is in the RAM.

6. The computer program product of claim 5 wherein if it is determined that previous data read was from the RAM, the value is decreased by a penalty if the requested data is not in the RAM.

7. The computer program product of claim 6 wherein if it is determined that previous data was read from the storage device, the value is in creased by the award.

8. The computer program product of claim 7 wherein the penalty is larger than the award.

9. A computer system comprising:
    at least one storage device for storing code data; and
    at least one processor for processing the code data to assign a value to a file when the file is opened, the value for determining whether previous data has been read from a random access memory (RAM) or from a storage device, to determine whether data from the file is being read randomly or sequentially upon receiving a request to read data from the file, the request including a range of data to be read, the range of data spanning more than one page, to determine, if data is being read randomly from the file, whether previous data has been read from the RAM or from a the storage device, to attempt to read the data from the RAM if previous data has been read from the RAM or read the data all at once from the storage device using only one page fault if previous data has been read from the storage device, and to increase the value by an award if the requested data is in the RAM.

10. The computer system of claim 9 wherein if it is determined that previous data was read from the RAM, the value is decreased by a penalty if the requested data is not in the RAM.

11. The computer system of claim 10 wherein if it is determined that previous data was read from the storage device, the value is increased by the award.

12. The computer system of claim 11 wherein the penalty is larger than the award.

* * * * *